US011352873B2

United States Patent
Khan et al.

(10) Patent No.: US 11,352,873 B2
(45) Date of Patent: Jun. 7, 2022

(54) SYSTEM AND METHOD TO IDENTIFY WATER MANAGEMENT CANDIDATES AT ASSET LEVEL

(71) Applicant: Saudi Arabian Oil Company, Dhahran (SA)

(72) Inventors: Waqas Ahmed Khan, Khobar (SA); Nauman Aqeel, Dhahran (SA); Ali M. Al-Shahri, Doha (SA)

(73) Assignee: Saudi Arabian Oil Company, Dhahran (SA)

( * ) Notice: Subject to any disclaimer, the term of this patent is extended or adjusted under 35 U.S.C. 154(b) by 1 day.

(21) Appl. No.: 17/095,833

(22) Filed: Nov. 12, 2020

(65) Prior Publication Data
US 2021/0348506 A1 Nov. 11, 2021

Related U.S. Application Data

(60) Provisional application No. 63/022,846, filed on May 11, 2020.

(51) Int. Cl.
*E21B 47/10* (2012.01)
*G01V 99/00* (2009.01)
*G06F 17/18* (2006.01)
*E21B 47/12* (2012.01)

(52) U.S. Cl.
CPC ............ *E21B 47/10* (2013.01); *G01V 99/005* (2013.01); *G06F 17/18* (2013.01); *E21B 47/12* (2013.01); *E21B 2200/20* (2020.05)

(58) Field of Classification Search
CPC ...... E21B 47/10; E21B 2200/20; E21B 47/12; G06F 17/18; G01V 99/005
See application file for complete search history.

(56) References Cited

U.S. PATENT DOCUMENTS

| | | | |
|---|---|---|---|
| 5,992,519 | A | 11/1999 | Ramakrishnan et al. |
| 6,571,619 | B2 | 6/2003 | Herron et al. |
| 7,054,749 | B1 | 5/2006 | O'Meara, Jr. |
| 7,168,310 | B2 | 1/2007 | Al-Ruwaili |
| 7,289,942 | B2 | 10/2007 | Yang et al. |

(Continued)

OTHER PUBLICATIONS

International Search Report and Written Opinion dated Apr. 22, 2021 pertaining to International application No. PCT/US2021/015611 filed Jan. 29, 2021, 17 pgs.

(Continued)

*Primary Examiner* — Natalie Huls
*Assistant Examiner* — Michael J Singletary
(74) *Attorney, Agent, or Firm* — Dinsmore + Shohl LLP

(57) ABSTRACT

Embodiments provided herein include systems and methods for identifying water management candidates at an asset level that includes receiving data related to a plurality of wells, where the data includes data related to water produced by the plurality of wells. Some embodiments include determining a water management index for each of the plurality of wells, where the water management index is calculated based on the received data. Some embodiments include selecting a designated well to perform a water management action, based on the water management index, determining a type of water management action for the designated well and providing the designated well and the type of water management action for display.

18 Claims, 19 Drawing Sheets

(56) References Cited

U.S. PATENT DOCUMENTS

| | | |
|---|---|---|
| 7,526,418 B2 | 4/2009 | Pita et al. |
| 7,660,711 B2 | 2/2010 | Pita et al. |
| 7,716,028 B2 | 5/2010 | Montaron et al. |
| 8,738,341 B2 | 5/2014 | Habashy et al. |
| 9,026,417 B2 | 5/2015 | Sequeira, Jr. et al. |
| 2005/0149307 A1 | 7/2005 | Gurpinar et al. |
| 2006/0085174 A1 | 4/2006 | Hemanthkumar et al. |
| 2008/0167849 A1 | 7/2008 | Hales et al. |
| 2009/0076632 A1* | 3/2009 | Kram .................. G06Q 10/063 700/33 |
| 2009/0299714 A1 | 12/2009 | Kelkar et al. |
| 2010/0142323 A1 | 6/2010 | Chu et al. |
| 2010/0161300 A1 | 6/2010 | Yeten et al. |
| 2010/0206559 A1 | 8/2010 | Sequeira, Jr. et al. |
| 2010/0235154 A1 | 9/2010 | Meurer et al. |
| 2010/0254217 A1 | 10/2010 | Chu et al. |
| 2011/0168391 A1 | 7/2011 | Saleri et al. |
| 2011/0250582 A1 | 10/2011 | Gates et al. |
| 2012/0253770 A1 | 10/2012 | Stern et al. |
| 2013/0096896 A1 | 4/2013 | Al-Shahri |
| 2013/0096897 A1* | 4/2013 | Shahri .................. G01V 1/308 703/10 |
| 2014/0257706 A1* | 9/2014 | Biterge .................. G01V 3/18 702/13 |
| 2017/0046619 A1* | 2/2017 | Towailib ................ G06Q 50/06 |
| 2017/0337302 A1* | 11/2017 | Mezghani ............... G06F 30/17 |
| 2018/0038204 A1* | 2/2018 | Khan .................... G01V 1/282 |

OTHER PUBLICATIONS

International Search Report and Written Opinion dated Apr. 30, 2021 pertaining to International application No. PCT/US2021/013154 filed Jan. 13, 2021, 14 pgs.

Coats, "Reservoir Simulation: State of the Art", Distinguished Author Series, SPE 10020, Society of Petroleum Engineers of AIME, pp. 1633-1642, Aug. 1982.

Coats, "Simulation of Gas Condensate Reservoir Performance", Society of Petroleum Engineeers, Journal of Petroleum Technology, pp. 1870-1886, 1985.

Coats, "Reservoir Simulation", Petroleum Engineering Handbook, pp. 48-1-48-20, 1987.

Coats et al., Compositional and Black Oil Reservoir Simulation, Society of Petroleum Engineers, SPE 29111, 1995.

Hodge et al., "A Survey of Outlier Detection Methodoloiges", Artificial Intelligence Review, vol. 22, No. 2, pp. 85-126, 2004.

Wang et al., "Estimation of Depths of Fluid Contacts and Relative Permeability Curves by History Matching Using Iterative Ensemble-Kalman Smoothers", Society of Petroleum Engineers, SPE Journal, pp. 509-525, Jun. 2010.

* cited by examiner

| COORDINATES | | | | | | |
|---|---|---|---|---|---|---|
| I | J | K | X | Y | Z | PORO |
| TARGET ENTRY AND TARGET DEPTH COORDINATES OF THE WELLS |||||||

FIG. 6K

SYSTEM AND METHOD TO IDENTIFY WATER MANAGEMENT CANDIDATES AT ASSET LEVEL

CROSS REFERENCE

This application claims priority to U.S. Provisional Application Ser. No. 63/022,846, filed on May 11, 2020.

TECHNICAL FIELD

Embodiments described herein generally relate to a system and method to identify water management candidates at the asset level, and more specifically to determining whether to sidetrack or shut-off a particular reservoir asset, based on water content.

BACKGROUND

One of the biggest challenges the oil and gas industry faces today is identifying water management candidates to control unwanted water production in oil producing wells. Conventional water management approaches typically look at information and data in silos. Specifically, data related to large numbers of reservoirs are reviewed by technicians who may use experience in the field for selecting a candidate for water management. Because these conventional water management approaches use only the experience of a technician, these approaches are prone to subjectivity. As such, a need exists in the industry for identifying water management candidates using an objective asset level analysis.

SUMMARY

Embodiments provided herein include systems and methods for identifying water management candidates at an asset level that includes receiving data related to a plurality of wells, where the data includes data related to water produced by the plurality of wells. Some embodiments include determining a water management index for each of the plurality of wells, where the water management index is calculated based on the received data. Some embodiments include selecting a designated well to perform a water management action, based on the water management index, determining a type of water management action for the designated well and providing the designated well and the type of water management action for display.

Embodiments of a system include a computing device that includes a memory component that stores logic that, when executed by the computing device causes the system to receive data related to a plurality of wells, where the data includes at least one of the following: a well water rate of each of the plurality of wells, a cumulative water produced by each of the plurality of wells, or a water cut of each of the plurality of wells. In some embodiments, the logic causes the computing device to determine a water management index for each of the plurality of wells, where the water management index is calculated based on at least a portion of the data. In some embodiments the logic causes the system to select a designated well to perform a water management action, based on the water management index and determine a type of water management action for the designated well, where the type of water management action includes at least one of the following: shut-off perforations, sidetrack the designated well or shut-off the designated well. In some embodiments, the logic causes the system to provide the designated well and the type of water management action for display.

Embodiments of a non-transitory computer-readable medium include logic that, when executed by a computing device cause the computing device to receive data related to a plurality of wells, where the data includes data related to water produced by the plurality of wells. In some embodiments, the logic causes the computing device to determine a water management index for each of the plurality of wells, where the water management index is calculated based on at least one of the following: a well water rate of each of the plurality of wells, a cumulative water produced by each of the plurality of wells, or a water cut of each of the plurality of wells. In some embodiments, the logic causes the computing device to select a designated well to perform a water management action, based on the water management index and determine a type of water management action for the designated well, where the type of water management action includes at least one of the following: shut-off perforations, sidetrack the designated well or shut-off the designated well. In some embodiments, the logic causes the computing device to provide the designated well and the type of water management action for display.

BRIEF DESCRIPTION OF THE DRAWINGS

FIGS. 6A-6K depict additional user interfaces for identifying water management candidates at an asset level and propose actions, according to embodiments provided herein;

DETAILED DESCRIPTION OF THE DISCLOSURE

This disclosure provides systems and methods for identifying water management candidates at an asset level and proposing actions. Embodiments described herein break down data from data silos and bring the data together through structured processes and workflows. Embodiments described herein also reduce subjectivity, since the decisions for identifying the water management candidates are data driven. Some embodiments utilize well production history through a structured and consistent set of workflows to identify water management candidates across an entire portfolio of oil fields and reservoirs. These embodiments are configured such that there is reduced subjectivity involved when selecting these well candidates within the field or even across the entire field portfolio.

In addition, embodiments described herein may integrate and cross-link well production history with a 3-dimensional (3D) subsurface model. Once the candidate wells are identified (based on production history), embodiments described herein utilize production history of offset wells and from the 3D subsurface model properties to suggest whether to shut-off water or sidetrack the well. In the case of water shut-off, these embodiments may recommend the perforations to be shut-off and in case of sidetrack, the embodiments may recommend well coordinates for sidetrack placement. Accordingly, these embodiments ensure that field water production is reduced and its reservoir energy is conserved through a consistent, structured, and unbiased data-driven mechanism. Moreover, the expensive facility expansion costs are saved to process huge amounts of unwanted produced water.

Similarly, some embodiments cross-link and integrate production data with subsurface 3D models all through a unique well identifier number. These embodiments reduce the need for engineers to open separate pieces of 3D modeling software and well logs software to perform analysis. On selection of one or more wells, these embodiments automatically retrieve well data, such as production profiles, logs and 3D properties across that well. Then through rules defined in the workflow, these embodiments propose whether to shut the well or to sidetrack. In case of sidetrack, the embodiments further provide desired coordinates.

Some embodiments described herein analyze the data through a water management index based on a unique set of formulae that outputs the water management candidate wells and ranks these wells in order of priority of field, reservoir, or entire portfolio level at discretion of a user. Successful application of the process enables reservoir management teams to curtail unwanted production and save expensive facility expansion costs to process huge amounts of water production from oil producing wells.

Figure 1:
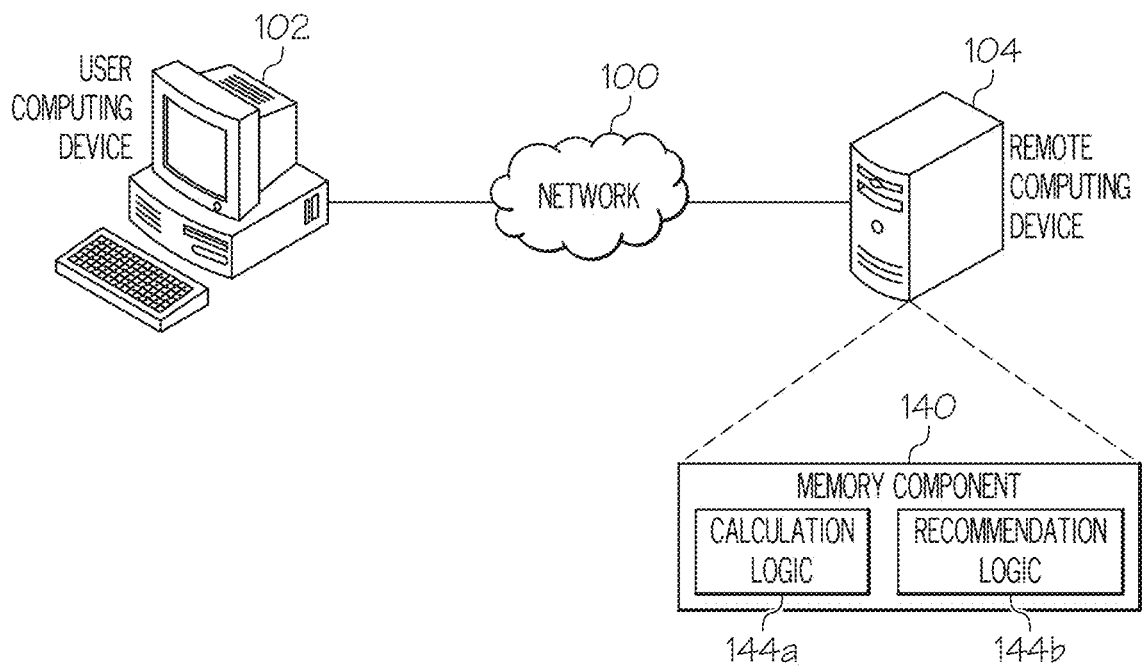
FIG. 1 depicts a computing environment for identifying water management candidates, according to embodiments provided herein.

Referring now to the drawings, FIG. 1 depicts a computing environment for identifying water management candidates, according to embodiments provided herein. As illustrated, the embodiment of FIG. 1 illustrates a network 100 coupled to a user computing device 102 and a remote computing device 104. The network 100 may include any wide area network (such as the internet, cellular network, mobile data network, WiMAX network, etc.), any local network (such as a local area network, Wi-Fi network, mesh network, etc.), and/or any peer-to-peer network (such as via Bluetooth, ZigBee, etc.). The user computing device 102 may be configured as any personal computer, laptop, mobile device, database, server, etc. for interfacing with a user and thus may include input devices and output devices for facilitating such interface. The remote computing device 104 may include any server, database, personal computer, tablet, mobile device, and/or other device for storing data described and/or performing the calculations described herein. As depicted in FIG. 1, the remote computing device 104 may include a memory component 140 that stores calculation logic 144a and recommendation logic 144b. As described in more detail below, the calculation logic 144a may be configured for causing a computing device (such as the user computing device 102 and/or the remote computing device 104) to accumulate data, perform the calculations, assemble graphical depictions of wells, etc. The recommendation logic 144b may cause the computing device to recommend a specific action, provide coordinates for that action, etc.

It will be understood that while FIG. 1 depicts a particular network configuration, this is merely one example. Some embodiments may be configured such that the user computing device 102 performs the calculations and recommendations (and thus stores the calculation logic 144a and/or the recommendation logic 144b) and only retrieves data from the remote computing device 104. In some embodiments at least a portion of the data is retrieved from a database or other file storage device, which may be implemented as the remote computing device 104 or other remote device. Other embodiments are also contemplated.

Figure 2:
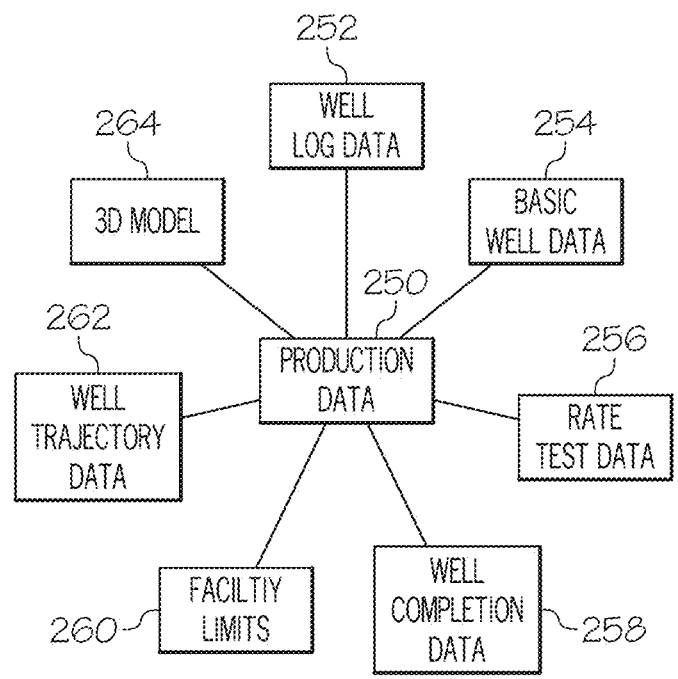
FIG. 2 depicts a data relationship diagram for relating tables to production data through a unique well identifier number, according to embodiments provided herein.

FIG. 2 depicts a data relationship diagram for relating tables to production data through a unique well identifier (UWI) number, according to embodiments provided herein. As illustrated, once the data is read, embodiments may be configured to link tables together to build relationships to derive valuable insights and apply standard practices and workflows. This is performed by relating the tables to production data 250 table through the corresponding UWI. With this, these embodiments may directly relate the production data 250 with at least the following: well log data 252, basic well data 254, rate test data 256, well completion data 258, facility limits data 260, well trajectory data 262, and/or 3D model data 264. Thus, by simply selecting production data for a well, these embodiments may provide associated data from any and/or all of the other tables without having to search independently.

Figure 3A:
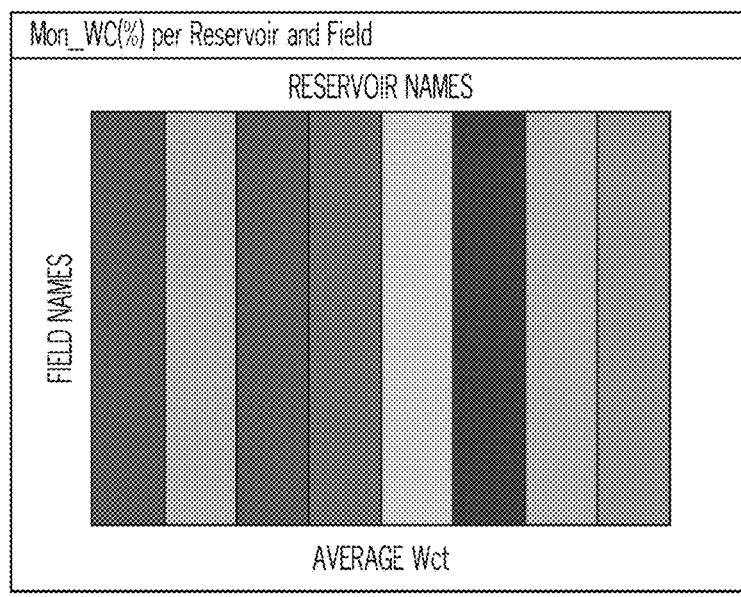
FIGS. 3A-3I depict fourteen different user interfaces for identifying water management candidates at an asset level and propose actions, according to embodiments provided herein.
Figure 3B:
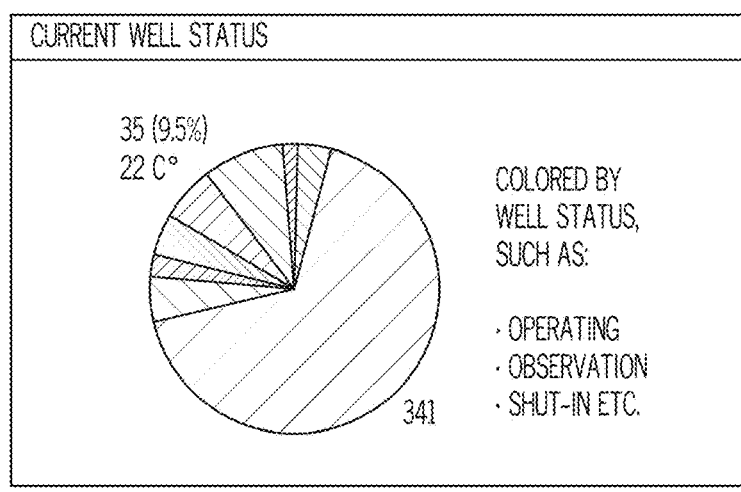

FIGS. 3A-3I depict different user interfaces for identifying water management candidates at an asset level and propose actions, according to embodiments provided herein. As illustrated in FIG. 3A, upon selection of at least a part of the portfolio (such as a well) a heat map providing water cut percentage per reservoir and field may be provided. The heat map may depict average water cut based on a color coding or other mechanism. In response to selection of one of the plurality of wells and/or other user input identifying one or more wells, FIG. 3B may be provided. FIG. 3B depicts a pie chart of the status of the selected wells (e.g. operating, observation, shut-off, sidetracked, etc.).

Figure 3C:
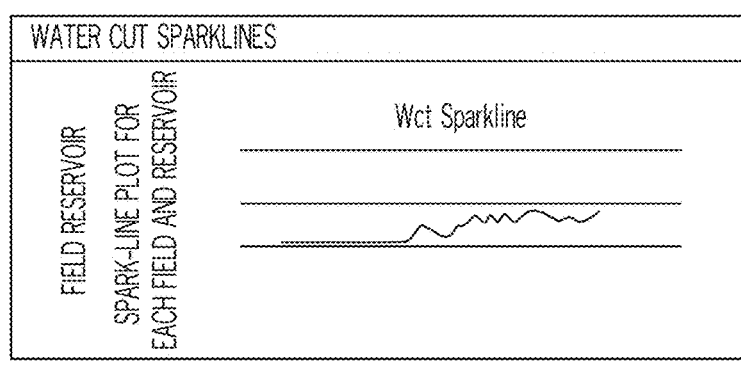
Figure 3D:
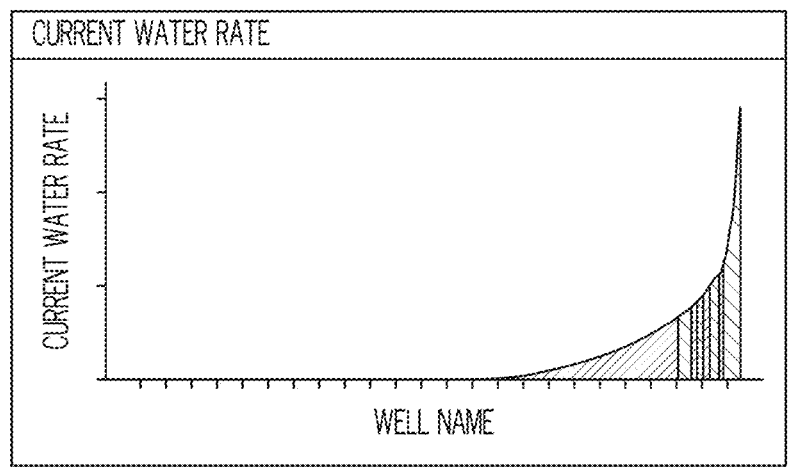
Figure 3E:
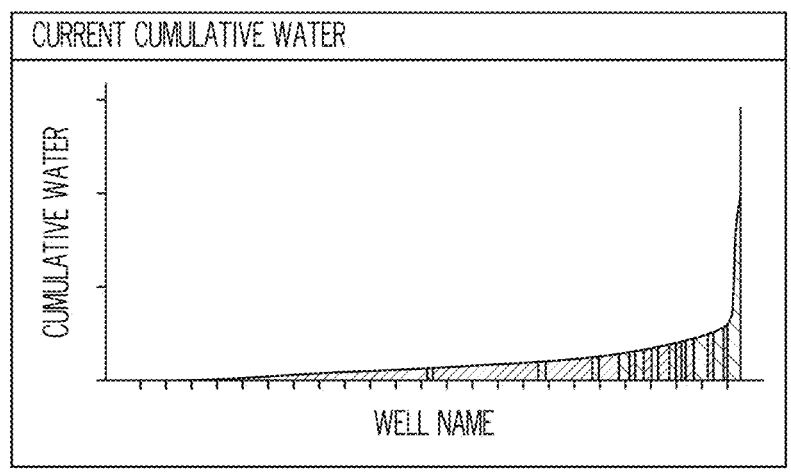
Figure 3F:
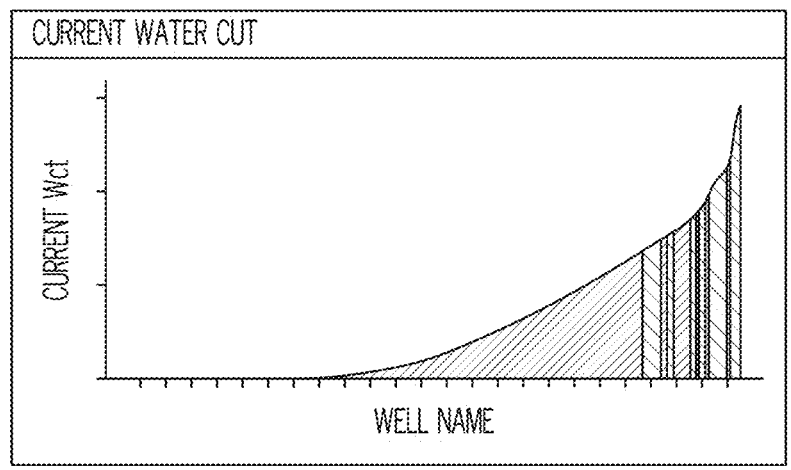
Figure 3G:
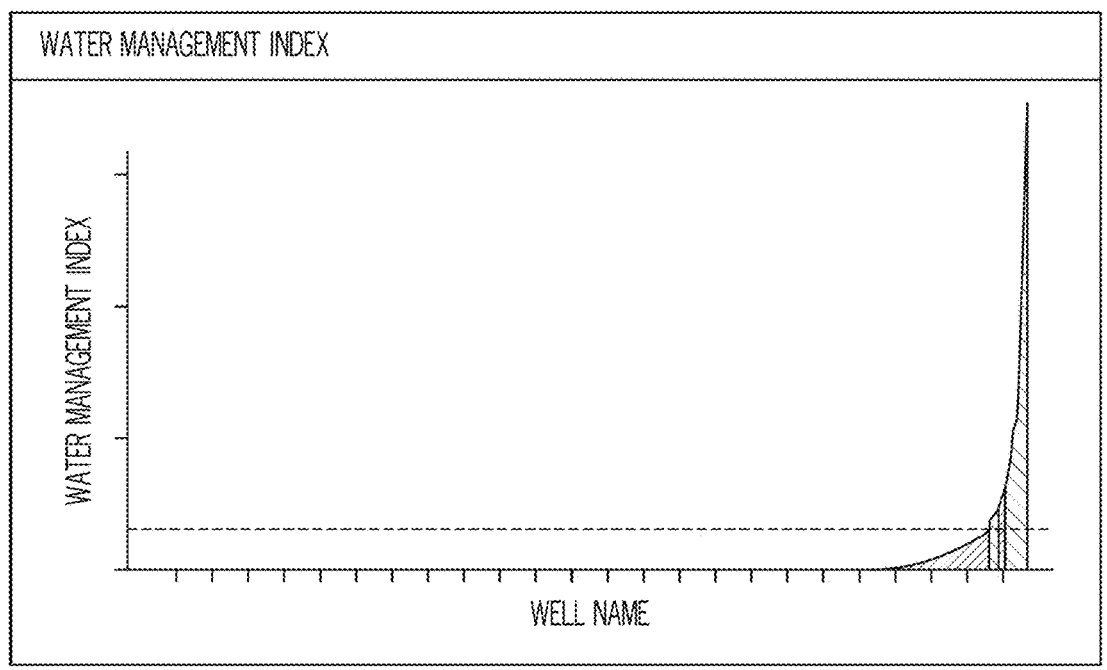
Figure 3H:
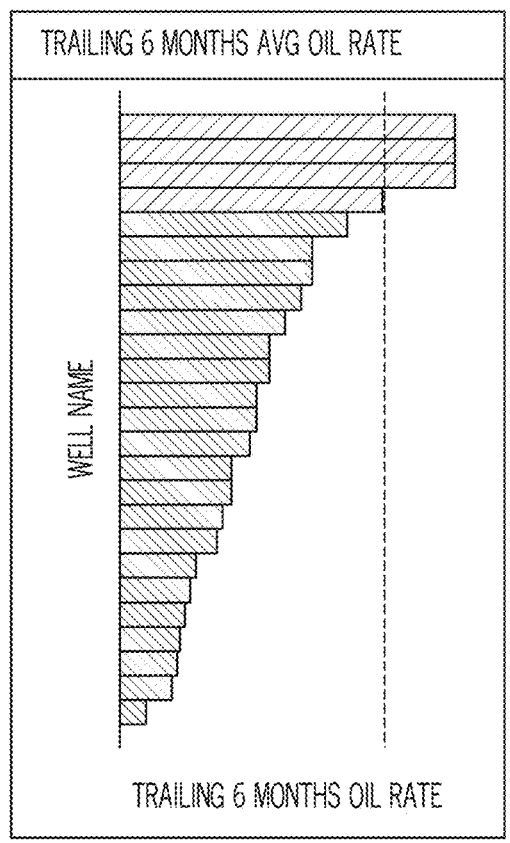

Similarly, FIG. 3C depicts spark lines for water cut profiles that created for each field and reservoir to compare and benchmark. A field and reservoir of choice may be selected from spark-line plot for further drill down. On selection, these embodiments may provide FIG. 3D. FIG. 3D provides current water rate of the well. FIG. 3E provides the cumulative water produced to date for the well. FIG. 3F provides the current water cut per well for the plurality of wells sorted by low to high. Based on this information from FIGS. 3D, 3E, and/or 3F, a water management index (WMI) may be calculated. FIG. 3G provides a water management index having units of water production rate may then be dynamically calculated. In some embodiments, WMI is calculated as a weighted average of these three variables:

$$\text{Water Management Index}(WMI) = WPR_{Current} \times Wct_{Current} \times \frac{Cum_{Water}}{Cum_{Liquid}}.$$

Figure 3I:
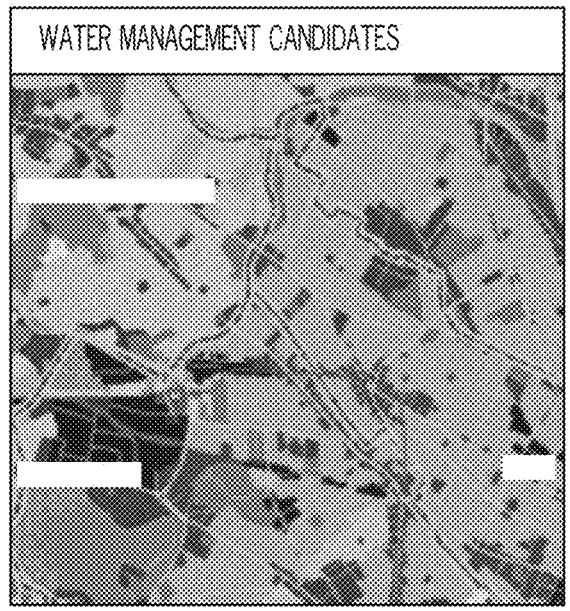

The WMI is compared against a threshold and may be sorted per well from low to high and is used to systematically identify water management candidates. The higher the value of WMI, the better is the well candidate for water management. These candidate wells may be selected with WMI>mean+1 standard deviation of the distribution. On selection of these wells, FIG. 3H may be provided, which depicts the trailing 6 months average oil rate of these wells. As a second level filter, embodiments may select the plurality of wells with current oil rate<mean+1 standard deviation. FIG. 3I depicts well locations of these wells on a GIS map.

Figure 4A:
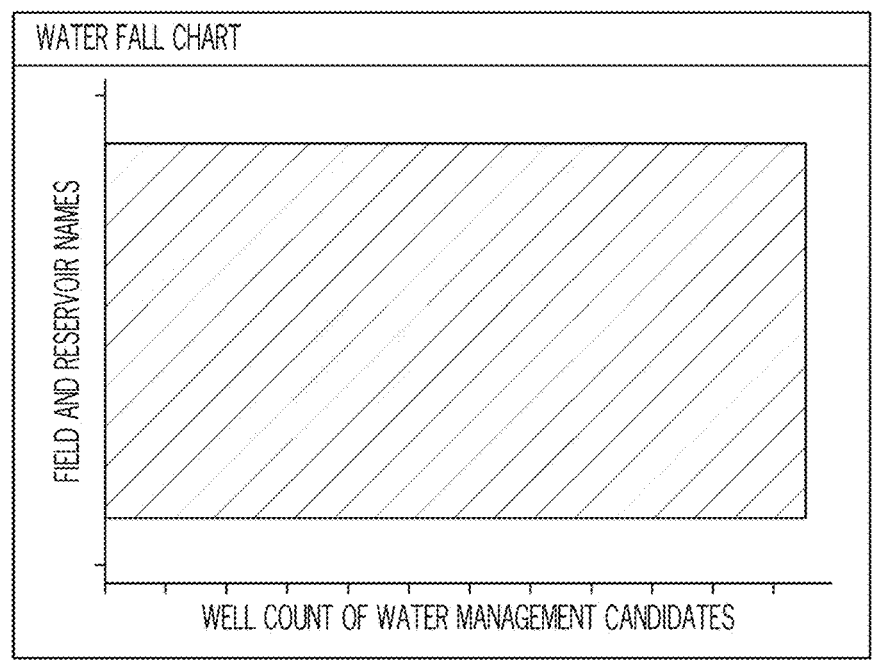
FIGS. 4A-4F depict additional user interfaces for identifying water management candidates at an asset level, according to embodiments provided herein.
Figure 4B:
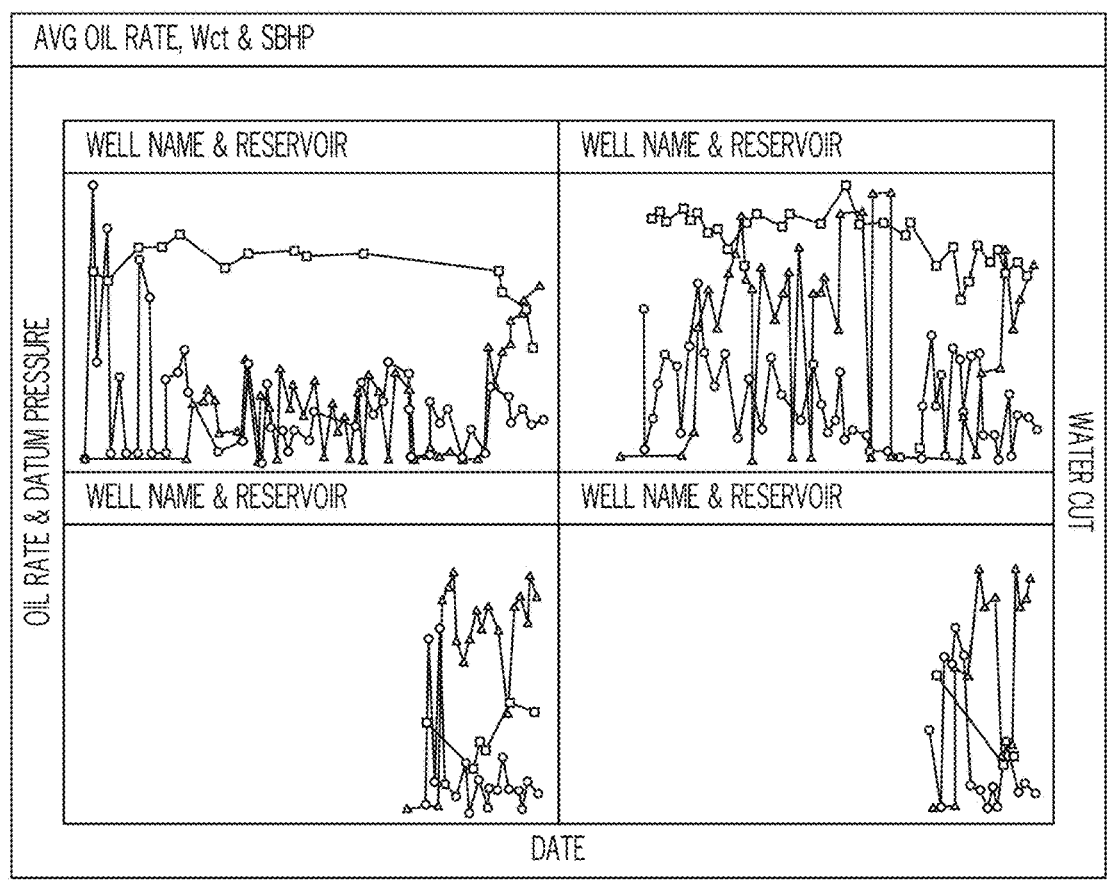
Figure 4C:
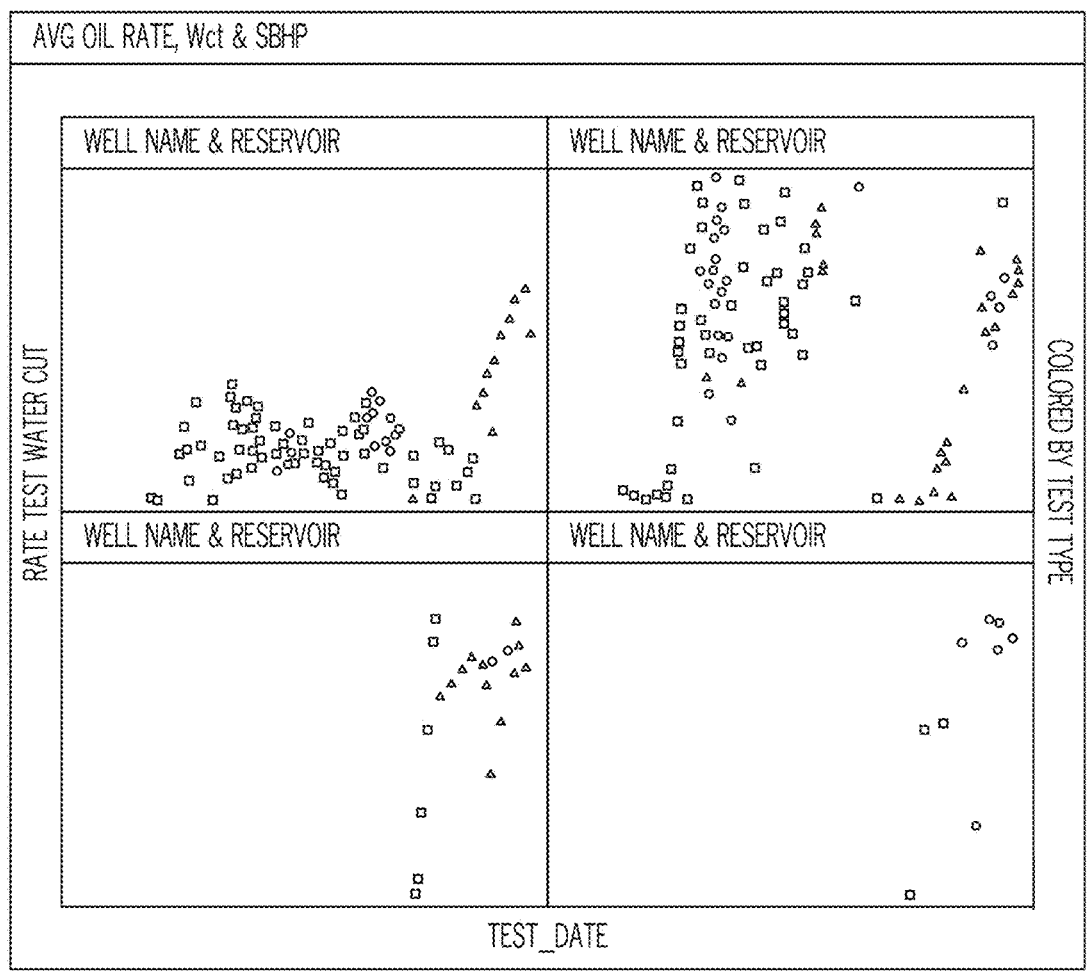
Figure 4D:
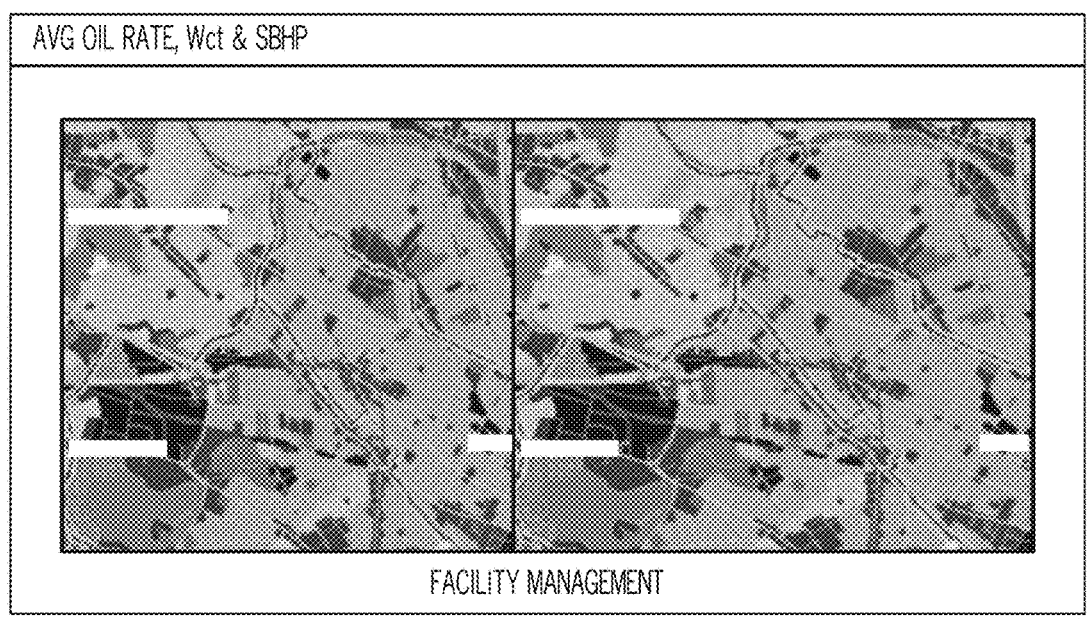
Figure 4E:
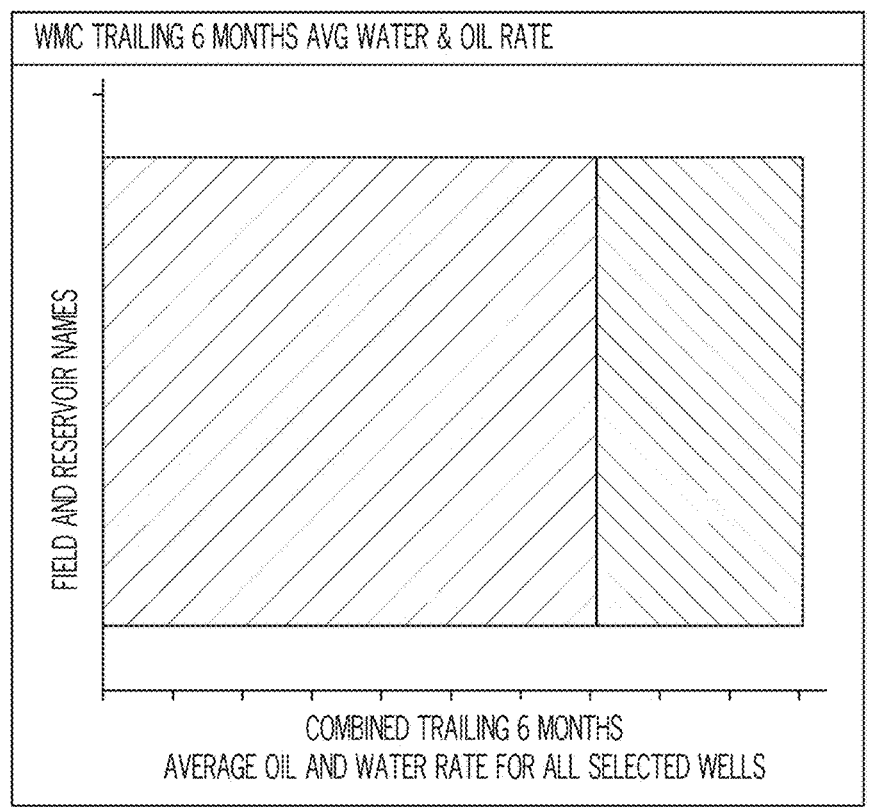
Figure 4F:
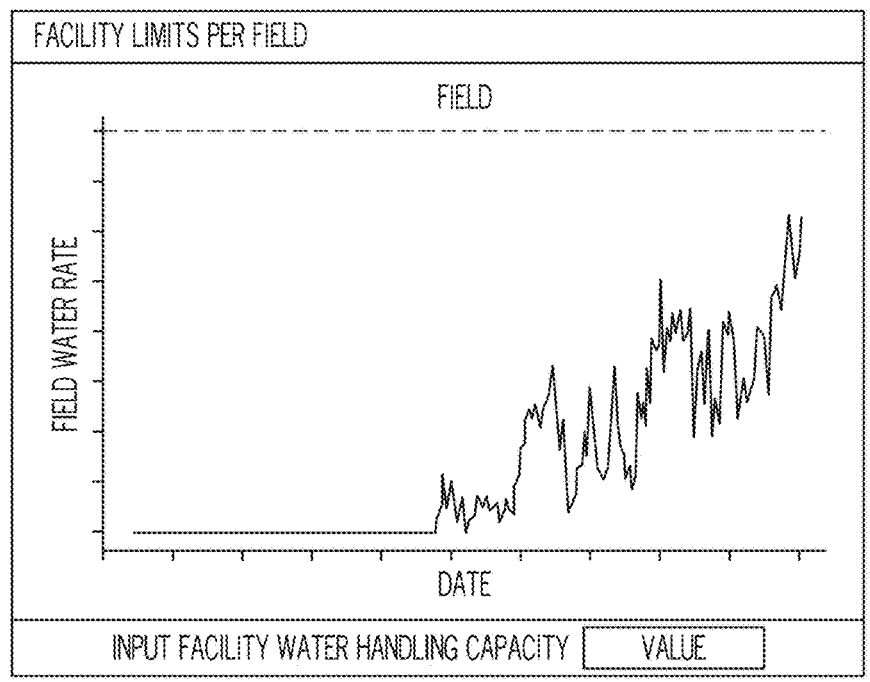

FIGS. 4A-4F depict additional user interfaces for identifying water management candidates at an asset level, according to embodiments provided herein. As illustrated in FIG. 4A, a water fall chart with a number of water management candidate wells per field and reservoir across the entire portfolio may be provided. FIG. 4A may provide well count of water management candidate wells versus field and reservoirs. FIG. 4B may provide complete oil production, water production, and pressure profile history of each candidate well along with information such as well completion events throughout its history. FIG. 4C depicts water cut from rate tests for all the plurality of wells that have been selected as candidate wells. FIG. 4D depicts a GIS map location of the candidate wells. FIG. 4E depicts a trailing 6 months average oil and water rate the candidate wells. FIG. 4F depicts water handling facility limit per field and aggregated water rate and water cut of the plurality of wells in the field.

Figure 5A:
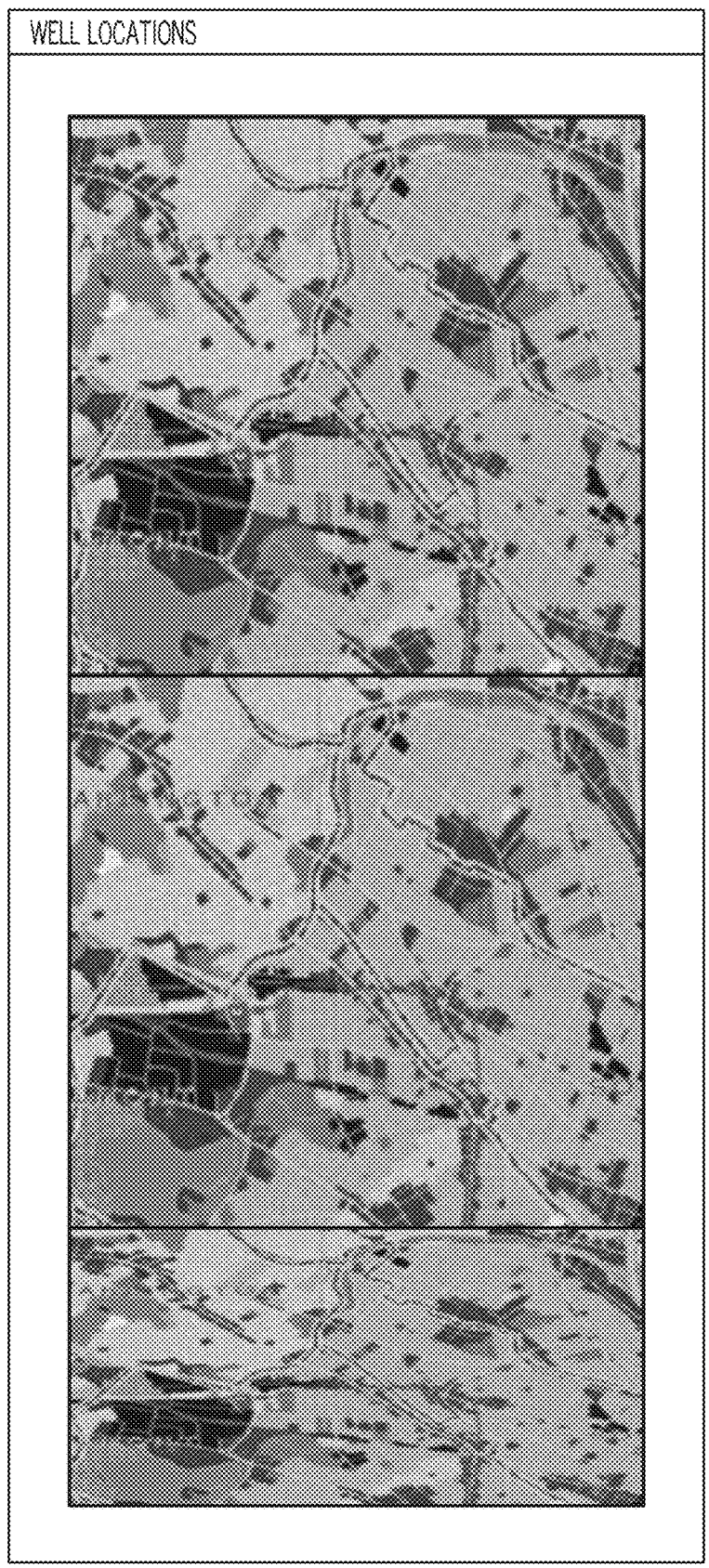
FIGS. 5A-5I depict additional user interfaces for identifying water management candidates at an asset level, according to embodiments provided herein.
Figure 5B:
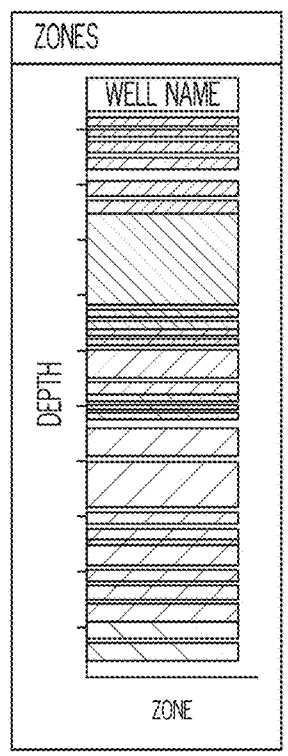
Figure 5C:
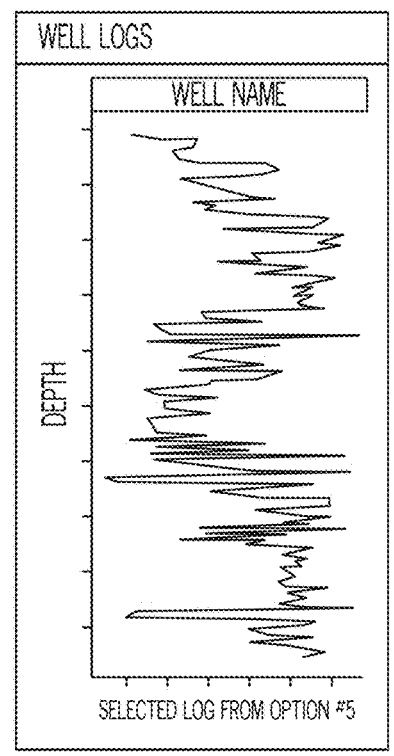
Figure 5D:
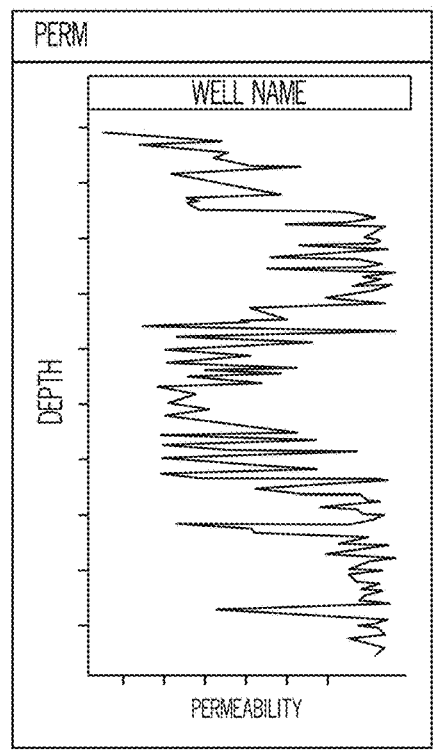
Figure 5E:
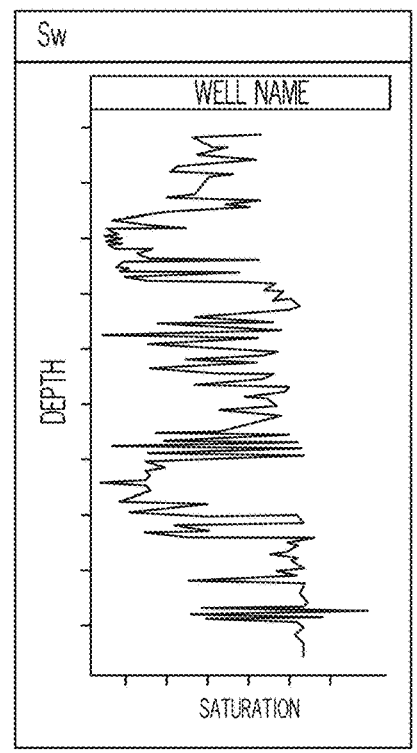
Figure 5F:
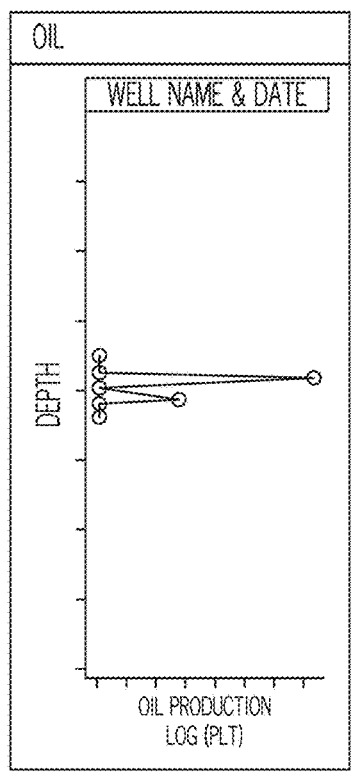
Figure 5G:
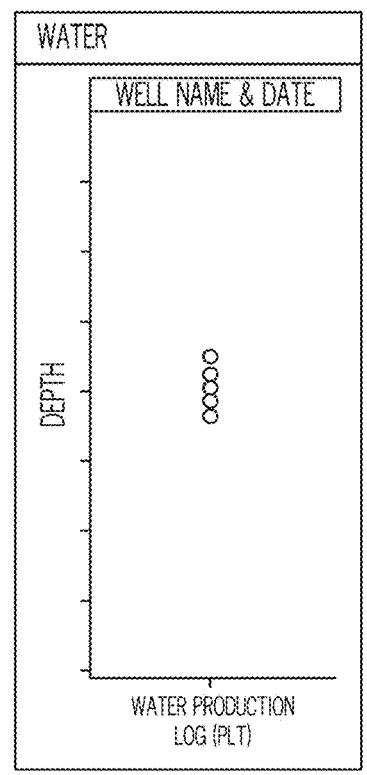
Figure 5H:
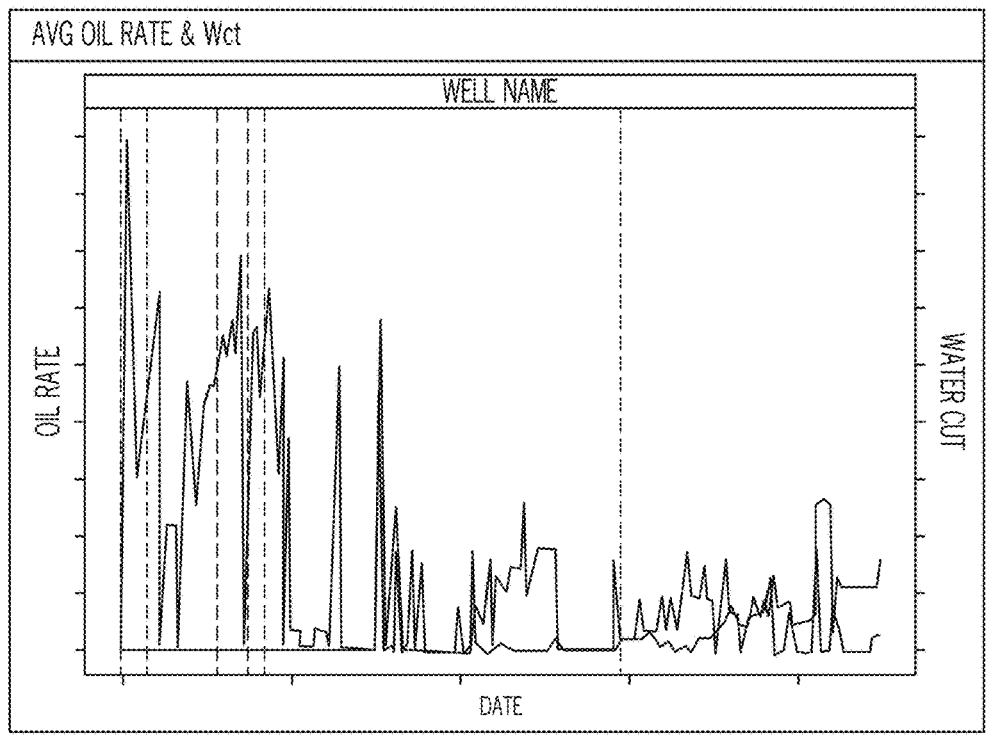
Figure 5I:
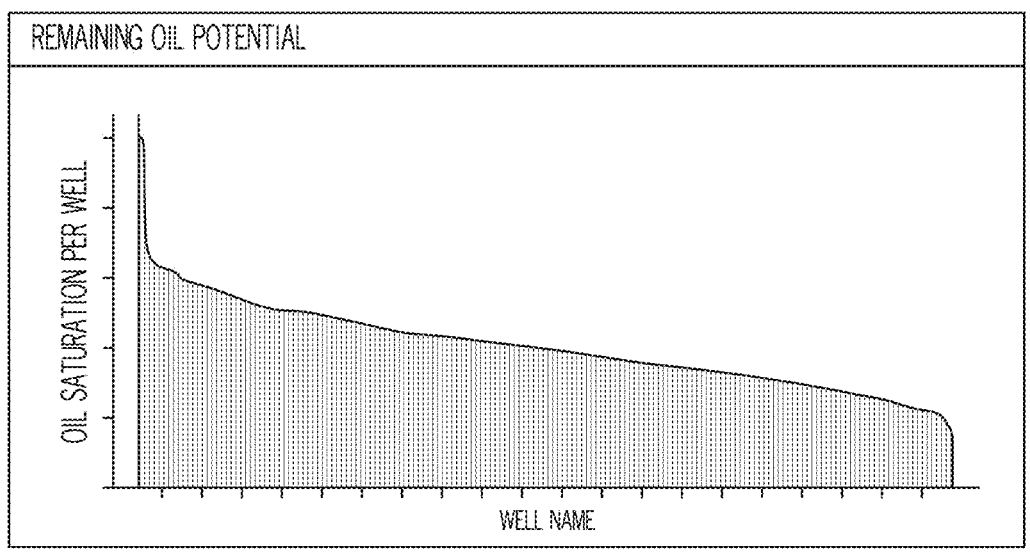

FIGS. 5A-5I depict additional user interfaces for identifying water management candidates at an asset level, according to embodiments provided herein. As illustrated, for each candidate well identified, embodiments may automatically bring the logs available for those wells as well as for the plurality of wells in proximity of the candidate wells. FIG. 5A depicts a GIS mapping of the candidate wells and those wells in proximity. FIG. 5B depicts zones of the candidate wells for a plurality of different depths. FIG. 5C depicts well logs of porosity based on depth. FIG. 5D depicts well logs of permeability for a plurality of depths. FIG. 5E depicts well logs of saturation for a plurality of depths. FIG. 5F depicts oil production logs for a plurality of depths. FIG. 5G depicts water production logs for a plurality of depths. FIG. 5H depicts production profiles of the candidate wells. FIG. 5I depicts remaining oil potential, which is calculated as average oil saturation per well, and a well list.

Figure 6A:
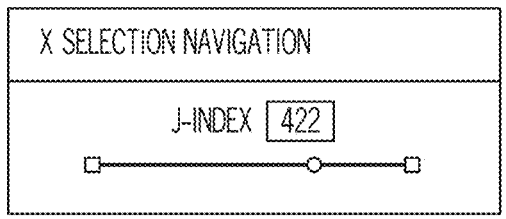
Figure 6B:
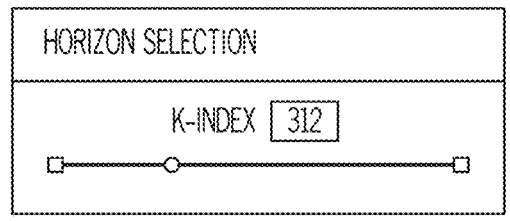
Figure 6C:
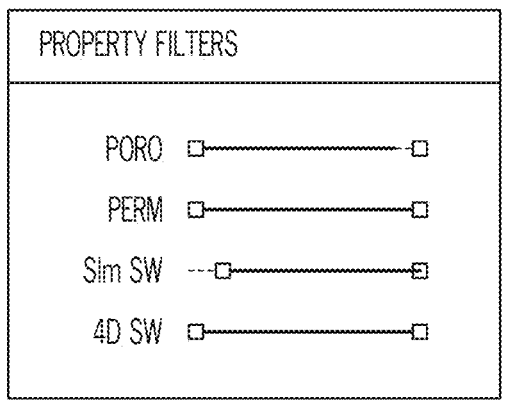
Figure 6D:
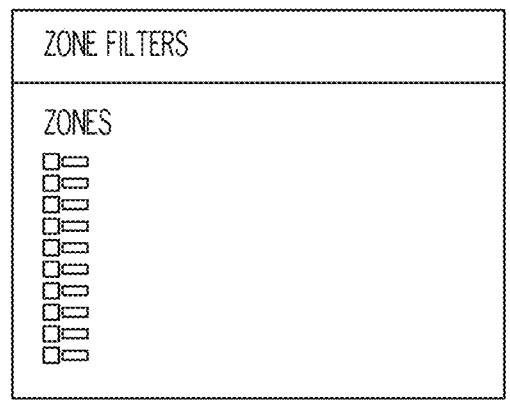

FIGS. 6A-6K depict additional user interfaces for identifying water management candidates at an asset level and propose actions, according to embodiments provided herein. If the close-by wells suggest a high water saturation from logs and high water cut from production history, some embodiments may be configured to propose to shutoff the well. Otherwise, these embodiments may utilize a 3D model to find the nearby opportunities and propose coordinates for sidetrack. This can be performed by extracting the well coordinates (for a well where sidetrack is being planned). As such, FIG. 6A depicts a slider for determining x selection navigation information. Similarly, FIG. 6B provides a slider for a horizontal selection. Property filters are provided in FIG. 6C. Zone filters are provided in FIG. 6D. These selections create the cross 3D property cross sections across the selected well.

Figure 6E:
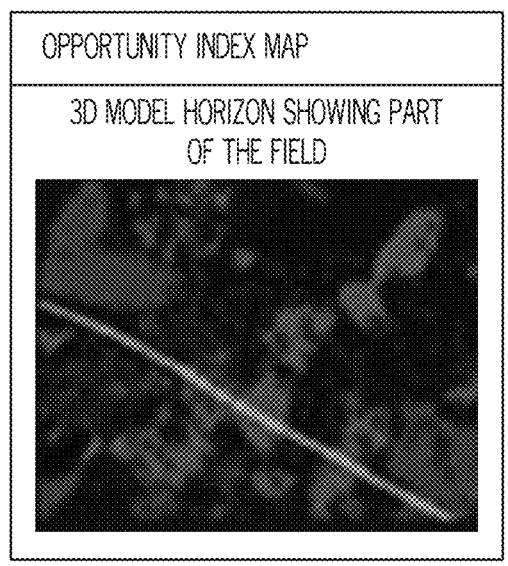
Figure 6F:
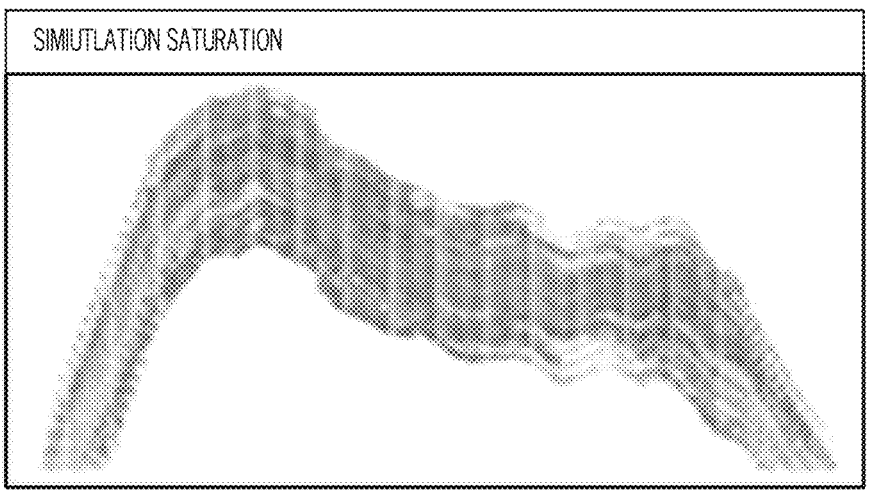
Figure 6G:
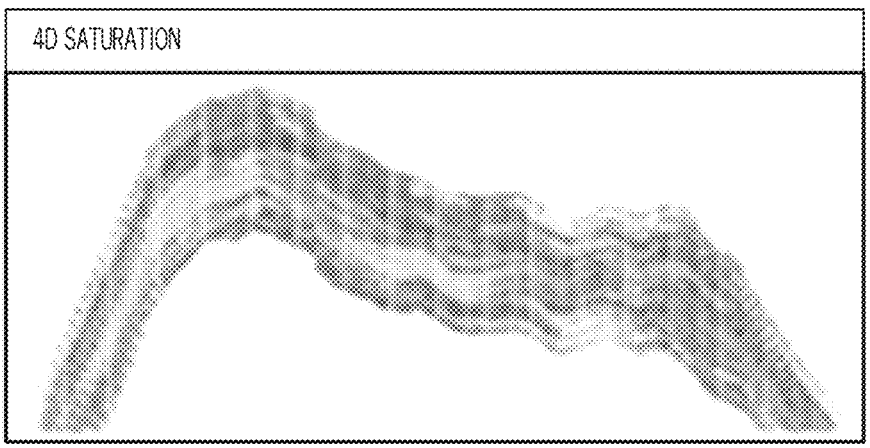
Figure 6H:
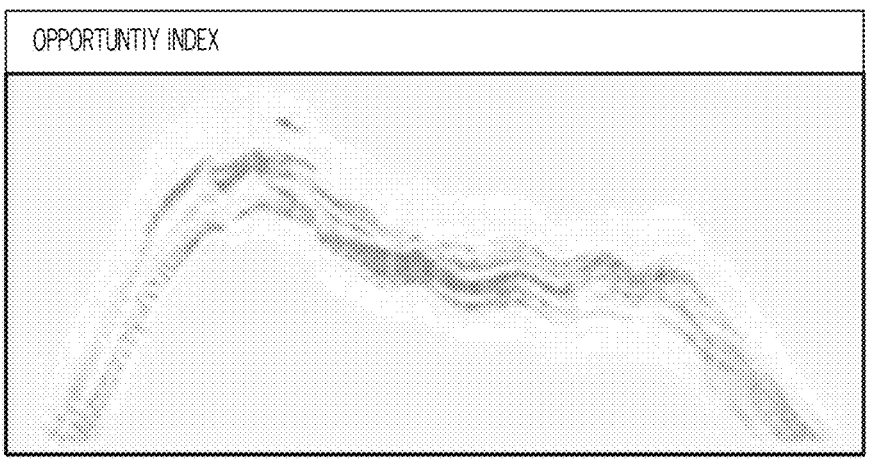
Figure 61:
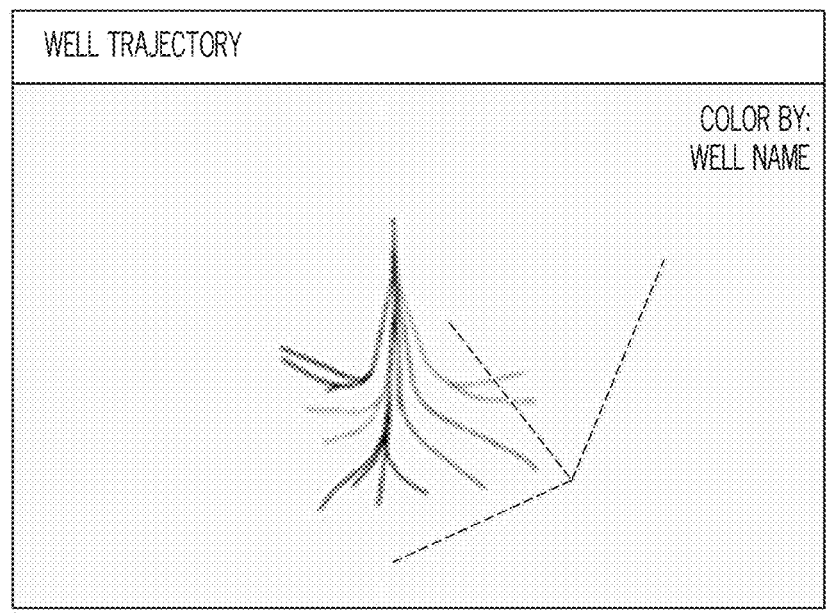
Figure 6J:
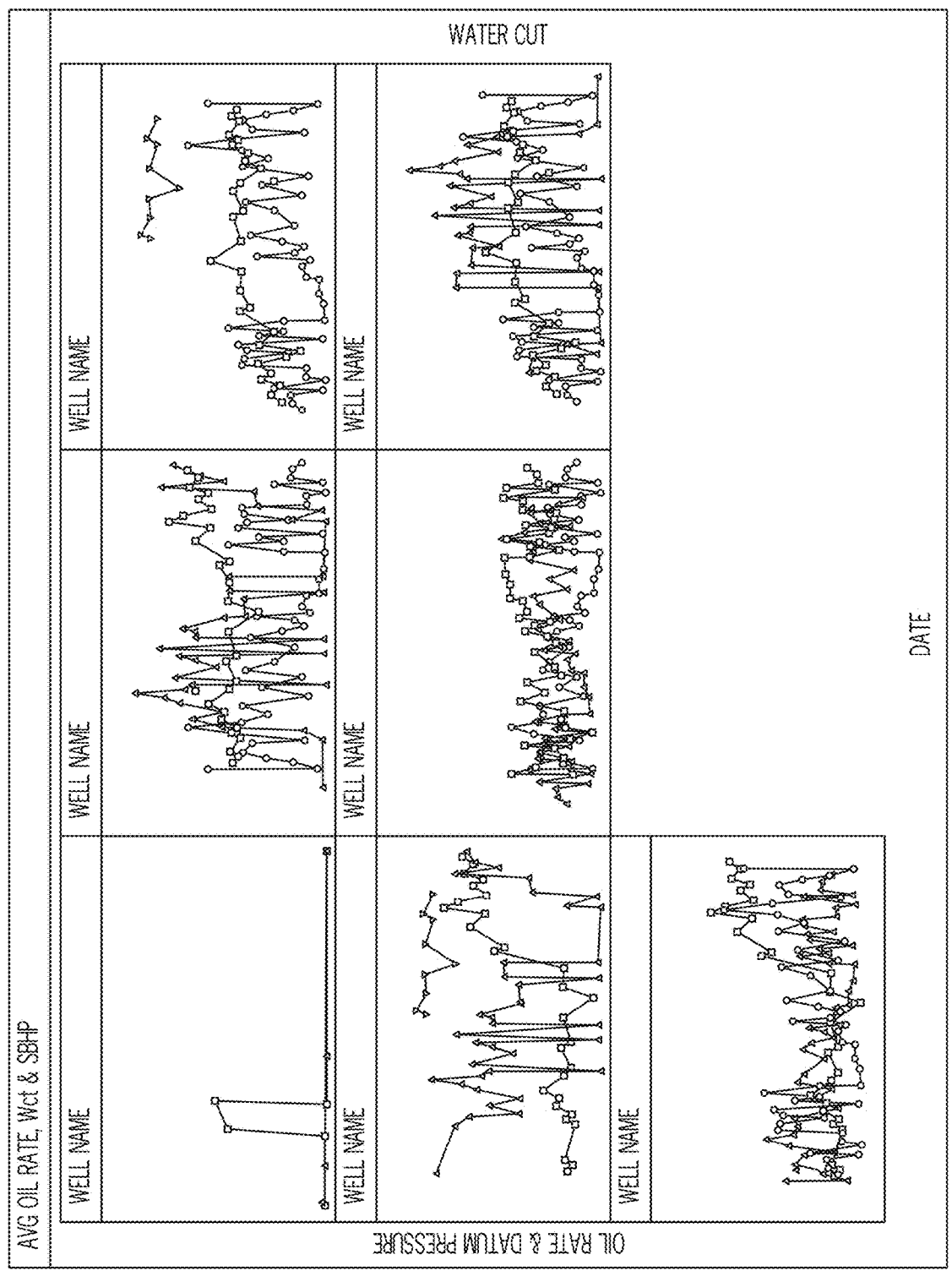

As illustrated, FIG. 6E contains a 3D opportunity index map by layer (where a first color signifies oil opportunity from a 4D surveillance model, and a second color represents opportunity from a simulation model (e.g., as provided in U.S. patent application Ser. No. 13/654,626, which is incorporated by reference in its entirety) along with the well locations and x-section plane location. FIG. 6F depicts 4D cross-sections for simulation saturation. FIG. 6G depicts 4D surveillance saturation for the area. FIG. 6H depicts an opportunity index. FIG. 6I depicts well trajectories. FIG. 6J depicts performance profiles of a plurality of wells in the vicinity of the candidate well. The sidetrack criteria requirements such as minimum/maximum porosity, permeability and/or oil saturation values are defined through property filters in FIG. 6C. If a specific zone is targeted, it may be defined through the zone filters of FIG. 6D.

Once these filters are set, the properties in FIGS. 6F, 6G, and 6H may be updated to show cells where the requirements are met. This creates multiple connected geo-bodies in the cross-section view windows. Knowing the location of the well then suggests target entry (TE) coordinates and target depth (TD) coordinates of the closest geo-body, as provided in FIG. 6K. These coordinates are then passed to a system, such as described in "Systems and Methods for Developing Hydrocarbon Reservoirs" US Patent (US 2018/0038204 A1), which is incorporated by reference in its entirety, to design wells which are then added into the well action plan (WAP) system to proceed with drilling the sidetrack/new well in the field.

Figure 7:
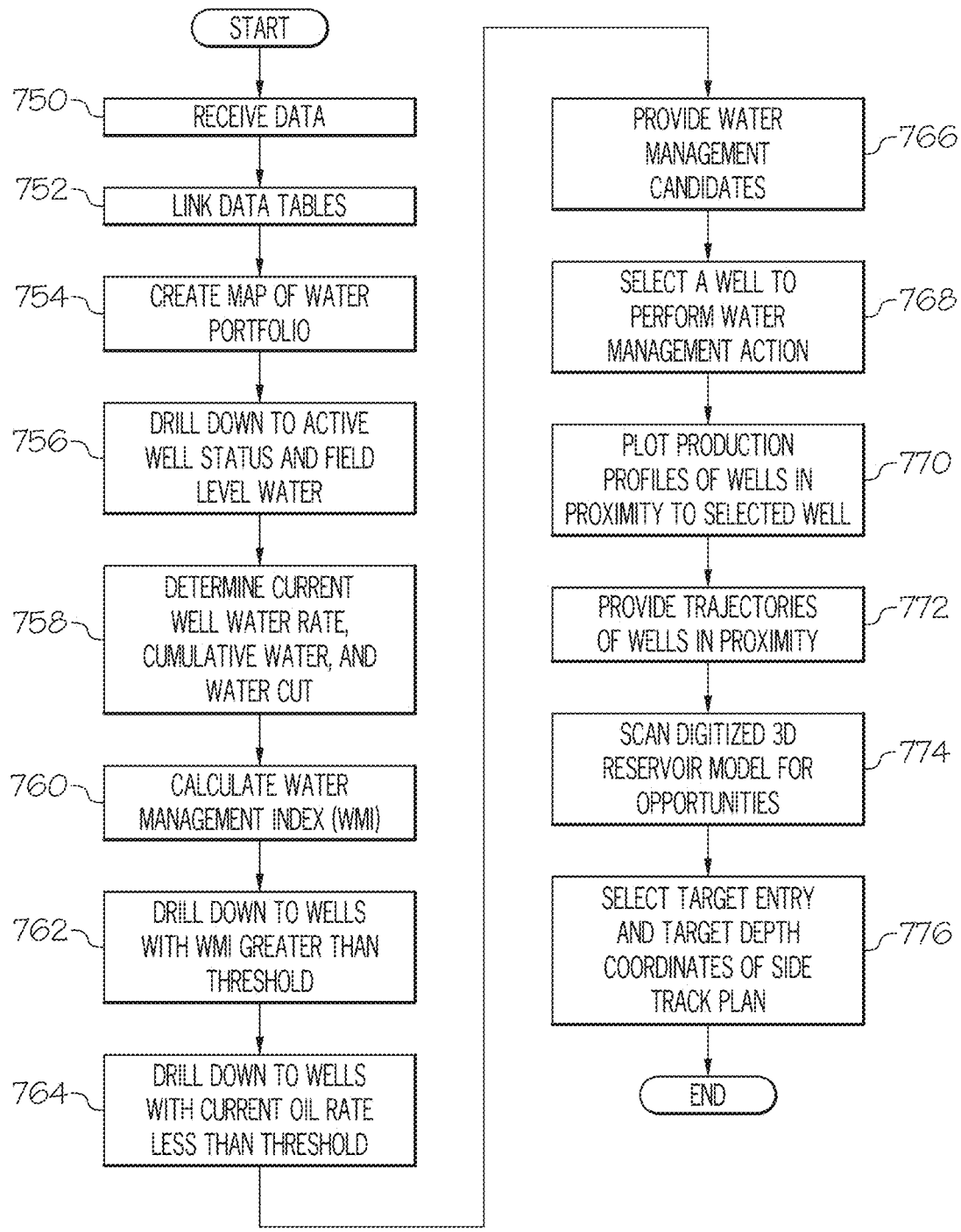
FIG. 7 depicts a flowchart for customized workflow in identifying water management candidates at the asset level and propose actions, according to embodiments provided herein.

FIG. 7 depicts a flowchart for customized workflow in identifying water management candidates at the asset level and propose actions, according to embodiments provided herein. As illustrated in block 750, the remote computing device 104 may automatically read and link multi sourced data that is continuously, periodically, and/or sporadically being updated as more data becomes available. This data may include production data 250 from FIG. 2 (e.g., for entire well history, from date of initial production to current date, etc.), which may include one or more of the following: field name, reservoir name, well name and number, unique well identifier (UWI), well type, fluid produced, crude grade, current well status, date, flowing well head pressure, well operating days, monthly oil volume produced, monthly water volume produced, monthly gas volume produced, average oil rate, average water rate, average gas rate, average water cut, trailing twelve months water cut, cumulative oil produced, cumulative water produced, cumulative gas produced.

The data may also include well log data 252 from FIG. 2, (single value per well). This well log data 252 may include a UWI, average porosity, average permeability, initial average water saturation, final average water saturation, porosity thickness (PHIH), permeability thickness, (KH), initial net oil column, final net oil column, reservoir contact, net to gross initial, net to gross final, well completion zone, and/or oil water contact.

The data may also include basic well data 254 from FIG. 2 (single value per well). This basic well data 254 may include a UWI, a universal transverse mercator x (UTMX) coordinate, a universal transverse mercator y (UTMY) coordinate, well geometry, well spud date, completion event date gas oil separation plant (GOSP) to which a well is assigned, rate test data, test date, type, validity code, total flow rate, oil flow rate, water cut, gas oil ration (GOR), flowing well-head pressure (FWHP), and/or choke size. The data may also include rate test data 256 from FIG. 2.

The data may also include well completion data 258 from FIG. 2, which may include a UWI, a date of last completion event, and/or depth intervals of open perforations. The data may also include facility limits data 260 from FIG. 2 (single value per field), which may include a field oil handling facility capacity and/or a field water handling facility capacity. The data may include well trajectory data 262 from FIG. 2, such as a UWI and/or X, Y, and Z coordinates for each well. The data may include 3D model data 264 from FIG. 2

(e.g., properties from a 3D gridded model), such as porosity, permeability, saturation, zones, opportunity index, well index (UWI), and/or other data.

Referring back to FIG. 7, in block 752, the relationships between data may be linked and, in block 754, the process generates a heat map of the entire water portfolio (or at least a portion of the portfolio), showing fields on the Y-axis, reservoirs on the X-axis and colored by the average water cut of the field (e.g., FIG. 3A). This provides a visual to understand the portfolio at a very high level. Performance of a specific field may be compared across its reservoirs or performance of a specific reservoir across the fields. More details become visible by a user selection of the desired fields/reservoir for drill down. In response to a user selection of a least a portion of the portfolio from heat map from FIG. 3A, a pie chart (FIG. 3B) may be created showing the status of the selected wells (e.g. operating, shut-off, abandoned etc.). Also spark lines for water cut profiles may be created for each field to compare and benchmark (FIG. 3C).

In block 756, the plurality of wells of choice may be selected from the well status pie chart (FIG. 3B) or all the plurality of wells in field may be selected from sparkline plot (FIG. 3C) for further drill down. In block 758, a current water rate, cumulative water produced to date, and the current water cut per well for the plurality of wells may be determined and provided for display (FIGS. 3D, 3E, 3F).

In block 760, a water management index may be calculated. In some embodiments, $$\text{Water Management Index}(WMI) = WPR_{Current} \times Wct_{Current} \times \frac{Cum\_Water}{Cum\_Liquid},$$

where WPR represents current well water rate, Wct represents water cut, $Cum_{water}$ represents cumulative water produced, and $Cum_{Liquid}$ represents cumulative liquid produced. In block 762, this WMI calculation may be sorted per well from low to high and may be used to systematically identify water management candidate wells. In some embodiments, the higher the value of WMI, the better representation of a candidate well is for water management. These well candidates may be drilled down based on a WMI value greater than a first predetermined threshold. As an example, well candidates may be selected with WMI>mean+1 standard deviation of the distribution. On selection of these candidate wells, the current oil rate of these candidate wells may also be plotted. In block 764, a drill down may be performed as a second level filter, to select wells with a current oil rate less that a second predetermined threshold. As an example, the second predetermined threshold may be current oil rate<mean+1 standard deviation.

In block 766, water management candidates may be provided based on the WMI and filtering. Specifically, the following well plots may be selected: a water fall chart with a number of water management candidates per field and reservoir across the entire portfolio; well locations of these wells on a graphic information services (GIS) map; a water facility limit, aggregated water rate, and water cut of the plurality of wells; calculated impact of water management on the field water production; and/or facility handling capacity of fields with selected wells. In block 768, a well may be selected to perform water management.

In block 770, embodiments may search wells in the vicinity and plots those wells' profiles along with their information such as spud date and last completion date and statistics such as remaining net oil, poro, perm etc. In block 772, embodiments may also plot the trajectories and logs of these close-by wells. If the surrounding wells from block 770 are all producing high water and the logs of close-by wells also indicate little oil opportunity, these embodiments propose the well to be shut-off. Otherwise the process may proceed to block 772.

In block 772, embodiments may explore the digitized 3D reservoir model for oil opportunities based on a consistent set of criteria. In block 774, the target entry (TE) coordinates and target depth (TD) coordinates for mechanical water shut-off or sidetrack may be displayed from the 3D reservoir model. In block 776, these TE and TD coordinates may be passed on to design wells which are then added into the WAP system to proceed with drilling the sidetrack/new well in the field, such as described in "Systems and Methods for Developing Hydrocarbon Reservoirs" U.S. Patent (US 2018/0038204 A1), which is incorporated by reference in its entirety.

Figure 8:
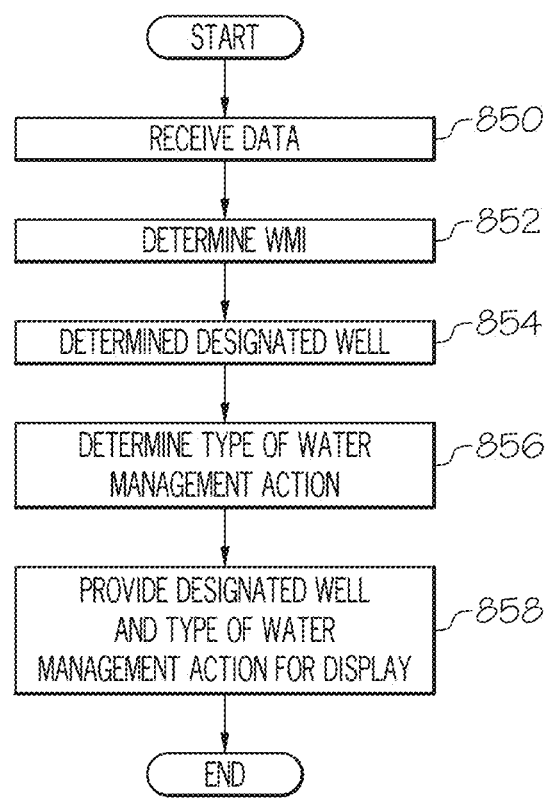
FIG. 8 depicts a flowchart for identifying water management candidates, according to embodiments provided herein.

FIG. 8 depicts a flowchart for identifying water management candidates, according to embodiments provided herein. As illustrated in block 850, data related to a plurality of wells may be received, where the data includes data related to water produced by the plurality of wells. In block 852, a water management index may be determined for each of the plurality of wells, where the water management index is calculated based on the received data, which may include a well water rate of each of the plurality of wells, a cumulative water produced by each of the plurality of wells, and/or a water cut of each of the well. In block 854, a designated well to perform a water management action may be selected, where the selection is based on the water management index. In block 856, a type of water management action may be determined for the designated well. The type of water management action may include at least one of the following: shut-off perforations, sidetrack the designated well or shut-off the designated well. In block 858, the designated well and the type of water management action may be provided for display.

Figure 9:
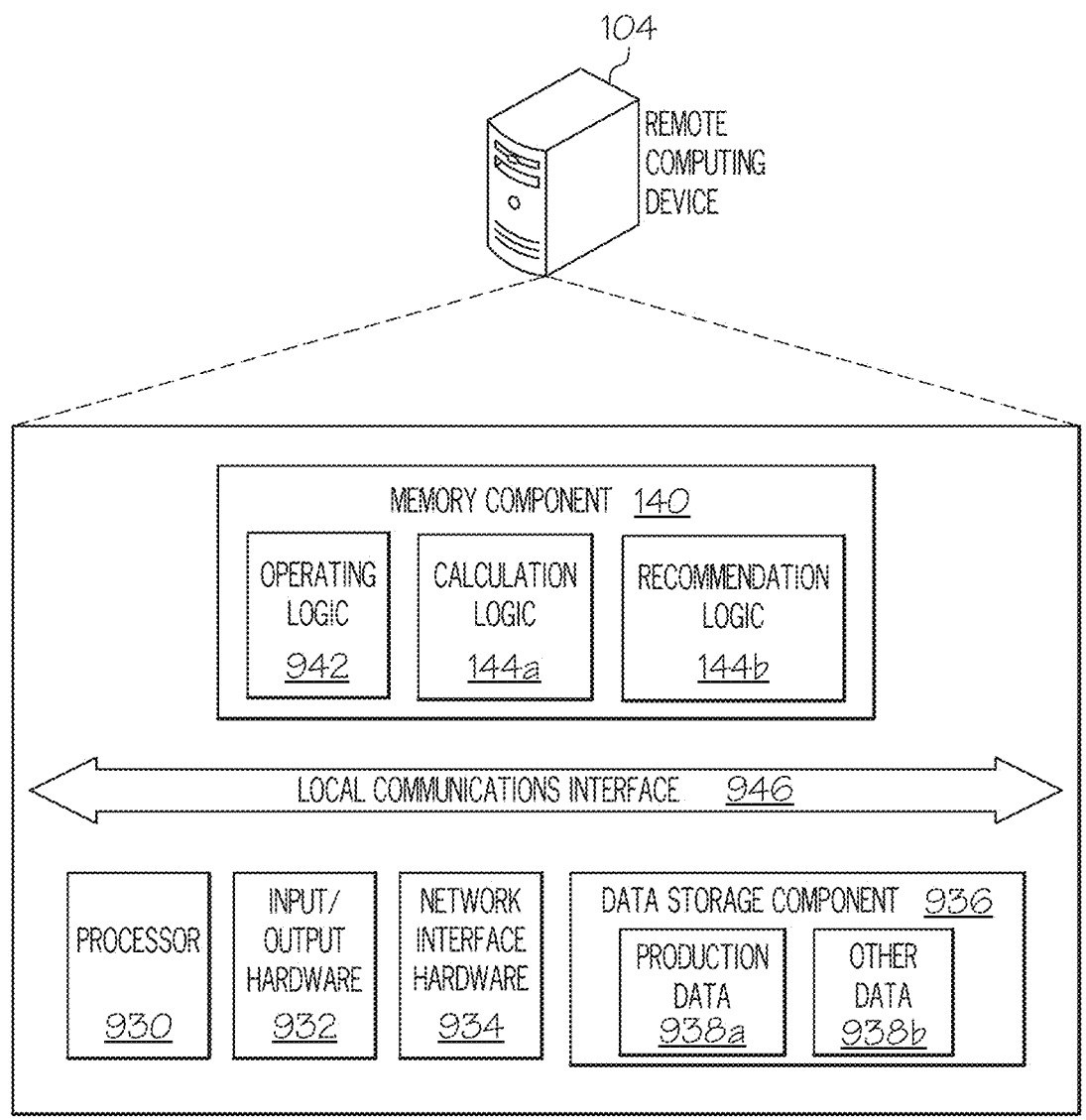
FIG. 9 depicts a remote computing device for identifying water management candidates according to embodiments provided herein.

FIG. 9 depicts a remote computing device 104 for identifying water management candidates according to embodiments provided herein. As illustrated, the remote computing device 104 includes a processor 930, input/output hardware 932, a network interface hardware 934, a data storage component 936 (which stores production data 938a and/or other data 938b as described with reference to FIG. 2), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the remote computing device 104 and/or external to the remote computing device 104.

The memory component 140 may store operating logic 942, the calculation logic 144a, and the recommendation logic 144b. Each of these logic components may include a plurality of different pieces of logic, each of which may be embodied as a computer program, firmware, and/or hardware, as an example. A local interface 946 is also included in FIG. 9 and may be implemented as a bus or other communication interface to facilitate communication among the components of the remote computing device 104.

The processor 930 may include any processing component operable to receive and execute instructions (such as from a data storage component 936 and/or the memory component 140). As described above, the input/output hardware 932 may include and/or be configured to interface with speakers, microphones, and/or other input/output components.

The network interface hardware 934 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 104 and other computing devices.

The operating logic 942 may include an operating system and/or other software for managing components of the remote computing device 104. As discussed above, the calculation logic 144a may reside in the memory component 140 and may be configured to cause the processor 930 to perform the calculations and depict the interfaces and plots described herein. The recommendation logic 144b may be configured to cause the processor 930 to provide the recommendations of type of water management strategy and/or provide locations and other details regarding that recommendation.

It should be understood that while the components in FIG. 9 are illustrated as residing within the remote computing device 104, this is merely an example. In some embodiments, one or more of the components may reside external to the remote computing device 104 or within other devices, such as the user computing device 102 depicted in FIG. 1. It should also be understood that, while the remote computing device 104 is illustrated as a single device, this is also merely an example. In some embodiments, the calculation logic 144a and the recommendation logic 144b may reside on different computing devices.

As an example, one or more of the functionalities and/or components described herein may be provided by the remote computing device 104 and/or the user computing device 102. Depending on the particular embodiment, any of these devices may have similar components as those depicted in FIG. 9. To this end, any of these devices may include logic for performing the functionality described herein.

Additionally, while the remote computing device 104 is illustrated with the calculation logic 144a and the recommendation logic 144b as separate logical components, this is also an example. In some embodiments, a single piece of logic may provide the described functionality. It should also be understood that while the calculation logic 144a and the recommendation logic 144b are described herein as the logical components, this is also an example. Other components may also be included, depending on the embodiment.

As illustrated above, various embodiments for identifying water management candidates at the asset level are disclosed. These embodiments may not only improve the granularity of strategy, but may also reduce subjectivity in determining and executing the strategy.

What is claimed is:

1. A system for identifying water management candidates at an asset level comprising: a computing device that includes a memory component that stores logic that, when executed by the computing device causes the system to perform at least the following: receive data related to a plurality of wells, wherein the data includes at least one of the following: a well water rate of each of the plurality of wells, a cumulative water produced by each of the plurality of wells, or a water cut of each of the plurality of wells; utilize a three dimensional (3D) model from the data related to the plurality of wells; determine a water management index for each of the plurality of wells, wherein the water management index is calculated based on at least a portion of the data and the 3D model; select a designated well to perform a water management action, based on the water management index; determine a type of water management action for the designated well, wherein the type of water management action includes at least one of the following: shut-off perforations, sidetrack the designated well or shut-off the designated well; provide the designated well and the type of water management action for display; and filter the plurality of wells based on whether a current oil rate of each of the plurality of wells is less than a mean oil rate, plus one standard deviation of the current oil rate of the plurality of wells.

2. The system of claim 1, wherein the data related to the plurality of wells includes at least one of the following: production data, well log data, basic well data, a rate test data, well completion data, facility limits data, well trajectory data, or 3D model data.

3. The system of claim 2, wherein:
the production data includes at least one of the following: a field name, a reservoir name, a well name and number, a unique well identifier (UWI), a well type, a fluid produced, a crude grade, a current well status, a date, a flowing well head pressure, a well operating days, a monthly oil volume produced, a monthly water volume produced, a monthly gas volume produced, an average oil rate, an average water rate, average gas rate, an average water cut, a trailing twelve months water cut, a cumulative oil produced, the cumulative water produced, a cumulative gas produced;
the well log data includes at least one of the following: the UWI, an average porosity, an average permeability, an initial average water saturation, a final average water saturation, a porosity thickness (PHIH), a permeability thickness, (KH), an initial net oil column, a final net oil column, a reservoir contact, a net to gross initial, a net to gross final, a well completion zone, or an oil water contact;
the basic well data includes at least one of the following: the UWI, a universal transverse mercator x (UTMX) coordinate, a universal transverse mercator y (UTMY) coordinate, a well geometry, a well spud date, a completion event date gas oil separation plant (GOSP), the rate test data, a test date, a type, a validity code, a total flow rate, an oil flow rate, the water cut, a gas oil ration (GOR), a flowing well-head pressure (FWHP), or a choke size;
the well completion data includes UWI, a date of last completion event, and depth intervals of open perforations;
the facility limits data includes at least one of the following: a field oil handling facility capacity or a field water handling facility capacity;
the well trajectory data includes at least one of the following: UWI or coordinates for each well; and
the 3D model data includes at least one of the following: porosity, permeability, saturation, zones, opportunity index, or UWI.

4. The system of claim 1, wherein the logic further causes the system to perform at least the following:

determine current well water rate of the plurality of wells, the cumulative water produced by the plurality of wells, and the water cut of the plurality of wells; and calculate the water management index for each of the plurality of wells from:

$$\text{water management index} = WPR_{Current} \times Wct_{Current} \times \frac{Cum_{Water}}{Cum_{Liquid}},$$

where WPR represents the current well water rate, Wct represents the water cut, $Cum_{water}$ represents the cumulative water produced, and $Cum_{Liquid}$ is represents cumulative liquid produced.

5. The system of claim 1, wherein the logic further causes the system to identify at least one water management candidate from the plurality of wells, wherein the at least one water management candidate is selected based on whether the water management index for each of the plurality of wells is greater than mean+1 standard deviation of a distribution of the plurality of wells.

6. The system of claim 1, wherein the logic further causes the system to perform at least the following:
determine target entry coordinates and target depth coordinates for a mechanical water shut-off or sidetrack; and
provide the target entry coordinates and the target depth coordinates for display.

7. The system of claim 1, wherein the logic further causes the system to generate a graphical depiction of at least one of the following: a water fall for each of the plurality of wells; well locations of the plurality of wells; a water facility limit for each of the plurality of wells, an aggregated water rate for each of the plurality of wells, the water cut of each of the plurality of wells, a calculated impact of water management on water production for each of the plurality of wells, or a facility handling capacity of fields associated with the plurality of wells.

8. The system of claim 1, wherein the logic further causes the system to perform at least the following:
search for neighboring wells in the vicinity of the plurality of wells;
plot a profile for the neighboring wells; and
provide information related to the neighboring wells, wherein the information includes at least one of the following: a spud date, a last completion date, a net oil produced, a porosity, and a permeability.

9. The system of claim 8, wherein determining the type of water management action for the designated well includes at least the following:
determining that the neighboring wells are producing high water and provide low oil opportunity; and
determining that the type of water management action is to shut-off the designated well.

10. The system of claim 8, wherein determining the type of water management action for the designated well includes at least the following:
determining that the neighboring wells are producing low water and provide high oil opportunity; and
determining that the type of water management action is to perform at least one of the following: shut-off perforations or sidetrack the designated well.

11. The system of claim 1, wherein the logic further causes the system to perform at least the following:
determine target entry coordinates and target depth coordinates for mechanical water shut-off and sidetrack; generate a 3D reservoir model for oil opportunities for the plurality of wells that includes the target entry coordinates and the target depth coordinates.

12. The system of claim 1, wherein the logic further causes the system to generate a heat map of the plurality of wells colored by average water cut.

13. A method for identifying water management candidates at an asset level comprising: receiving, by a computing device, data related to a plurality of wells, wherein the data includes a well water rate of each of the plurality of wells, a cumulative water produced by each of the plurality of wells, and a water cut of each of the plurality of wells; utilizing, by the computing device, a three dimensional (3D) model from the data related to the plurality of wells; determining, by the computing device, a water management index for each of the plurality of wells, wherein the water management index is calculated from the data and the 3D model based on the well water rate of each of the plurality of wells; the cumulative water produced by each of the plurality of wells, and the water out of each of the plurality of wells; selecting, by the computing device, a designated well to perform a water management action, based on the water management index; determining, by the computing device, a type of water management action for the designated well, wherein the type of water management action includes at least one of the following: shut-off perforations, sidetrack the designated well or shut-off the designated well; and providing, by the computing device, the designated well and the type of water management action for display.

14. The method of claim 13, further comprising:
determining current well water rate of the plurality of wells, the cumulative water produced by the plurality of wells, and the water cut of the plurality of wells; and calculating the water management index for each of the plurality of wells from: water management index=WPR_Current×Wct_Current×(Cum_Water)/(Cum_Liquid), where WPR represents current well water rate, Wct represents the water cut, Cumwater represents the cumulative water produced, and Cum-Liquid represents cumulative liquid produced.

15. The method of claim 13, further comprising identifying at least one water management candidate from the plurality of wells, wherein the at least one water management candidate is selected based on whether the water management index for each of the plurality of wells is greater than mean+1 standard deviation of a distribution of the plurality of wells.

16. The method of claim 13, wherein determining the type of water management action for the designated well includes at least the following:
determining that neighboring wells are producing high water and provide low oil opportunity; and
determining that the type of water management action is to shut-off the designated well.

17. A non-transitory computer-readable medium for identifying water management candidates at an asset level that stores logic that, when executed by a computing device, causes the computing device to perform at least the following: receive data related to a plurality of wells, wherein the data includes at least one of the following: a well water rate of each of the plurality of wells; a cumulative water produced by each of the plurality of wells, or a water cut of each of the plurality of wells; utilize a three dimensional (3D) model from the data related to the plurality of wells; determine a water management index for each of the plurality of wells, wherein the water management index is calculated from the data and the 3D model; select a designated well to perform a water management action, based on the water management index; determine a type of water management action for the designated well, wherein the type of water management action includes at least one of the following: sidetrack the designated well or shut-off the designated well; provide the designated well and the type of water management action for display; and identify at least one water management candidate from the plurality of wells, wherein the at least one water management candidate is selected based on whether the water management index for each of the plurality of wells is greater than mean+1 standard deviation of a distribution of the plurality of wells.

18. The non-transitory computer-readable medium of claim 17, wherein the logic further causes the computing device to perform at least the following:

determine current well water rate of the plurality of wells, the cumulative water produced by the plurality of wells, and the water cut of the plurality of wells; and calculate the water management index for each of the plurality of wells from: water management index=WPR_Current×Wct_Current×(Cum_Water)/(Cum_Liquid), where WPR represents the current well water rate, Wct represents the water cut, Cumwater represents the cumulative water produced, and Cum-Liquid represents cumulative liquid produced.

* * * * *